(12) United States Patent
Hu et al.

(10) Patent No.: US 9,115,817 B2
(45) Date of Patent: Aug. 25, 2015

(54) ROTATION JOINT AND MULTIPLE AIR CHANNEL WORKSTATION USING THE SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Zhi-Gang Hu, Shenzhen (CN); Xin-Jian Zhang, Shenzhen (CN); Yuan-Ling Mo, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 87 days.

(21) Appl. No.: 14/057,182

(22) Filed: Oct. 18, 2013

(65) Prior Publication Data
US 2014/0116550 A1    May 1, 2014

(30) Foreign Application Priority Data

Oct. 31, 2012    (CN) .................. 2012 1 04268424

(51) Int. Cl.
*F16K 3/22*    (2006.01)
*F16K 11/076*    (2006.01)

(52) U.S. Cl.
CPC ....... *F16K 11/076* (2013.01); *Y10T 137/86863* (2015.04)

(58) Field of Classification Search
CPC ................................ F16K 31/22; F16K 11/076
USPC ..................... 137/625.11, 625.46, 625.47
See application file for complete search history.

(56) References Cited

U.S. PATENT DOCUMENTS

| 6,851,450 | B2 * | 2/2005 | Nimberger ................. 137/561 A |
| 6,904,936 | B2 * | 6/2005 | Ma ........................... 137/625.47 |
| 7,426,939 | B2 * | 9/2008 | Jorg .......................... 137/625.47 |
| 8,235,709 | B2 * | 8/2012 | Meagher et al. ............. 431/280 |

FOREIGN PATENT DOCUMENTS

TW    201139909 A1    11/2011

* cited by examiner

*Primary Examiner* — Kevin Lee
(74) *Attorney, Agent, or Firm* — Novak Druce Connolly Bove + Quigg LLP

(57) ABSTRACT

A rotation joint includes a base and a rotation member sleeved on the base. An end of the base defines at least one first air guiding hole and a first air outlet. An outer sidewall of the base defines an air guiding groove. The air guiding groove extends around an axis of the base. A bottom wall of the air guiding groove defines a second air guiding hole communicating with the first air guiding hole. The outer sidewall of the base further defines a second air outlet. The first air outlet communicates with the second air outlet. Sidewalls of the rotation member define connecting holes. One of the connecting holes communicates with the second air outlet, while the other connecting holes communicate with the air guiding groove. The present disclosure further provides a multiple air channel workstation using the rotation joint.

17 Claims, 5 Drawing Sheets

ROTATION JOINT AND MULTIPLE AIR CHANNEL WORKSTATION USING THE SAME

BACKGROUND

1. Technical Field

The present disclosure relates to joints, and particularly to a rotation joint and a multiple air channel workstation using the rotation joint.

2. Description of Related Art

Systems having a number of devices often require multiple air channels so that each device is connected to one air channel. However, each device requires a controller and a vacuum generator or an air source. Thus, a cost of the system is high.

Therefore, there is room for improvement in the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
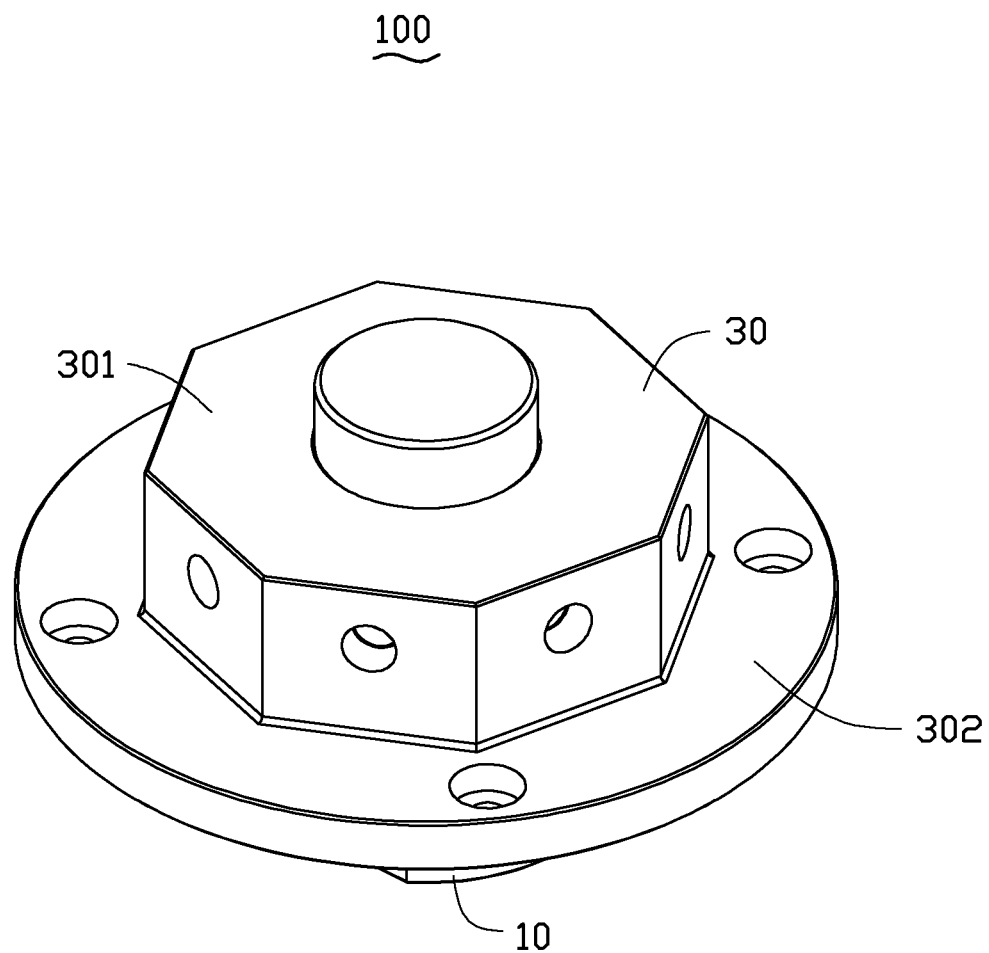
FIG. 1 is an assembled, isometric view of an embodiment of a rotation joint including a base.
Figure 5:
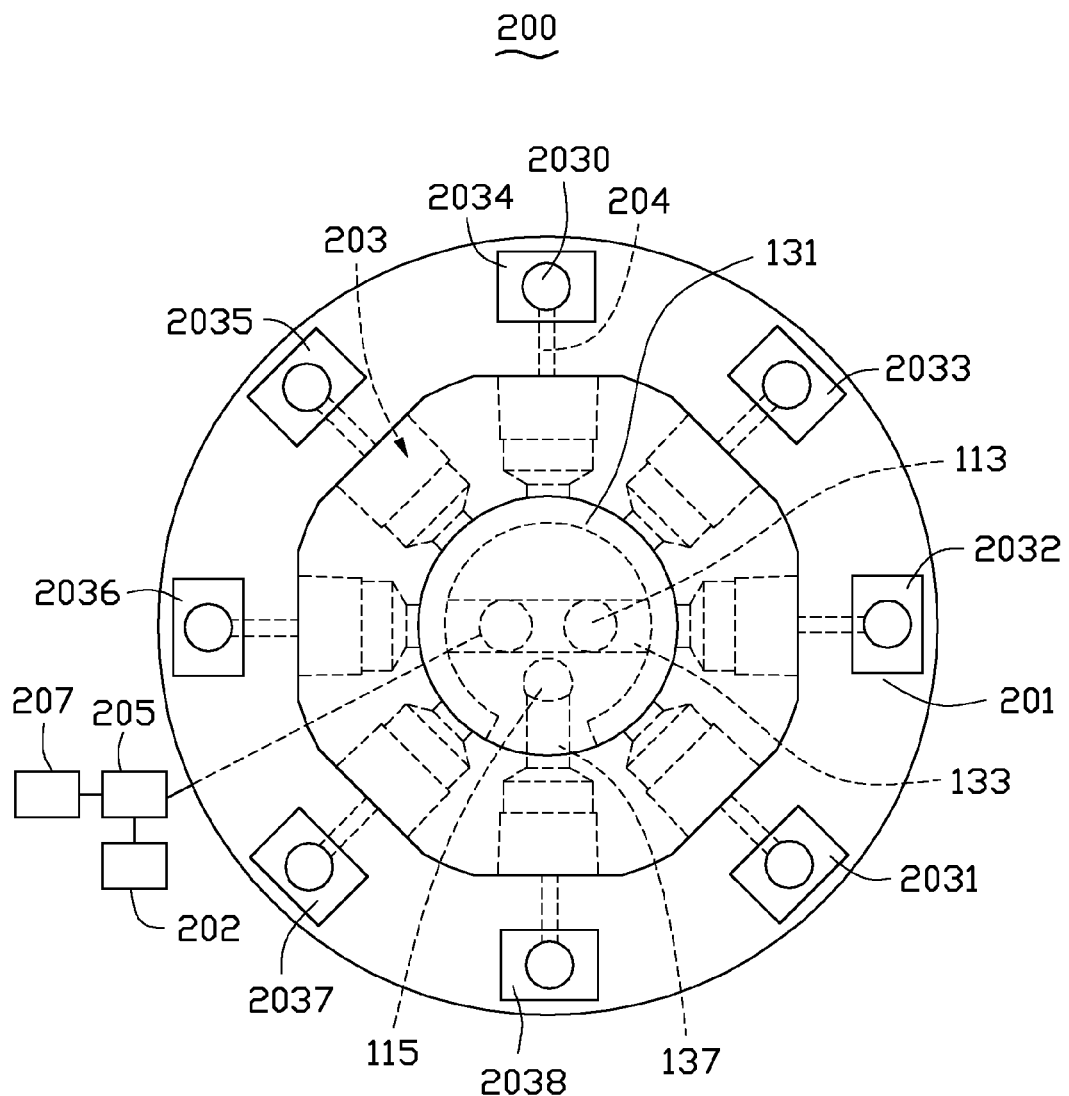
FIG. 5 is a top view of an embodiment of a multiple air channel workstation.

FIG. 1 shows one embodiment of a rotation joint 100 to be used in a multiple air channel workstation 200 (shown in FIG. 5). The rotation joint 100 includes a base 10 and a rotation member 30 rotatably sleeved on the base 10.

Figure 2:
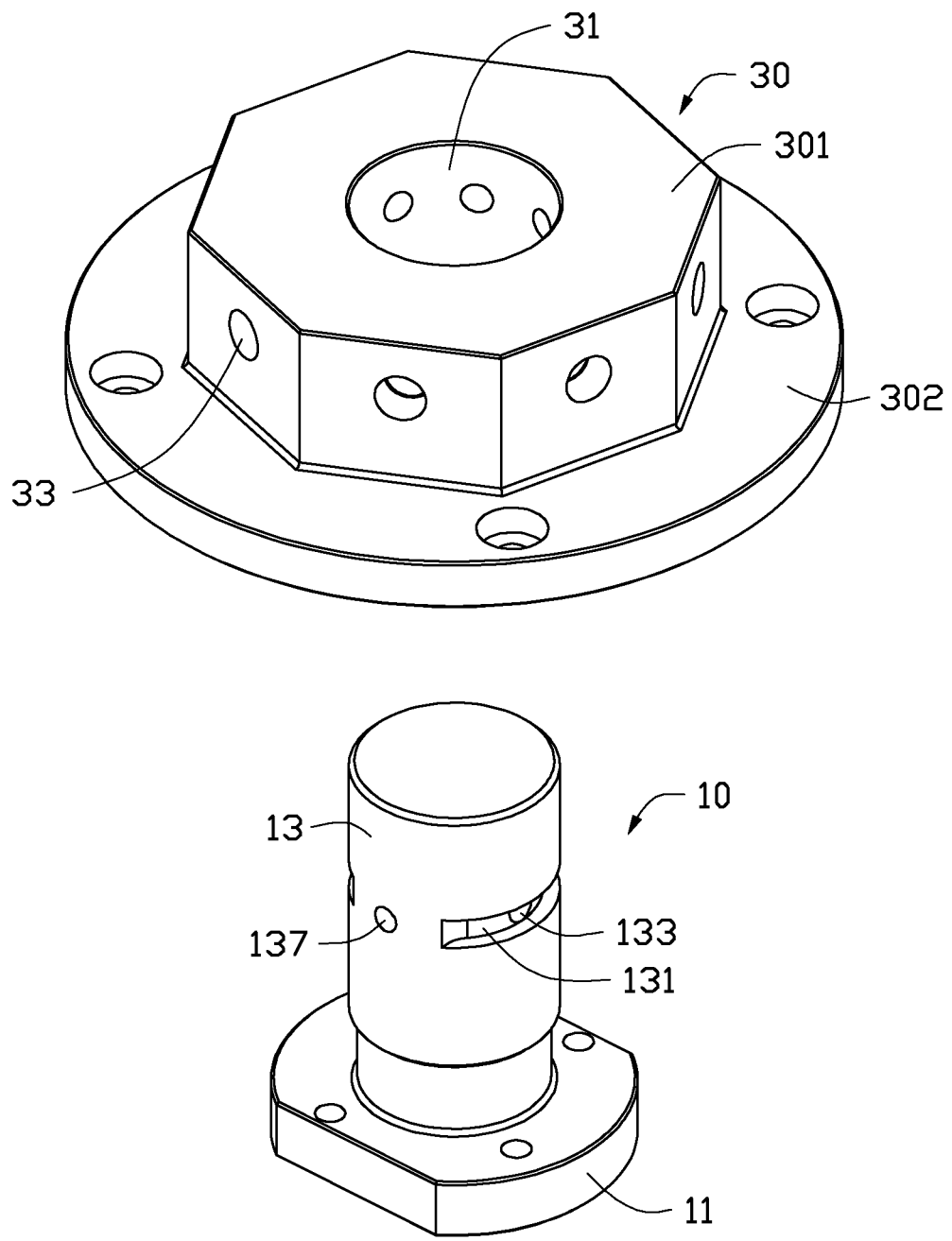
FIG. 2 is an exploded, isometric view of the rotation joint and base of FIG. 1.
Figure 3:
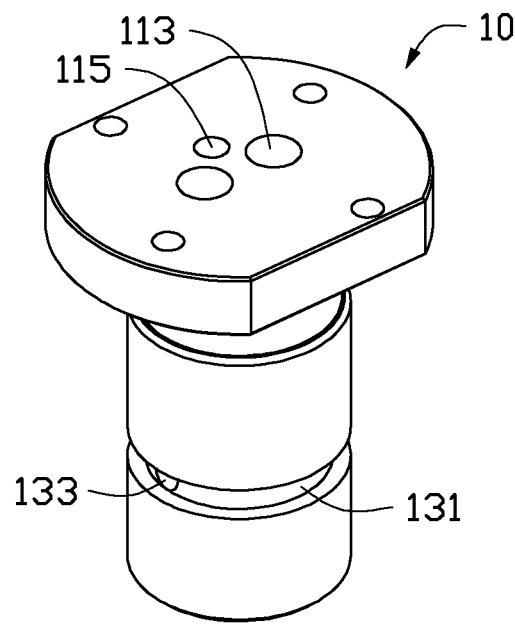
FIG. 3 is similar to FIG. 1, but viewed from another aspect.
Figure 3:
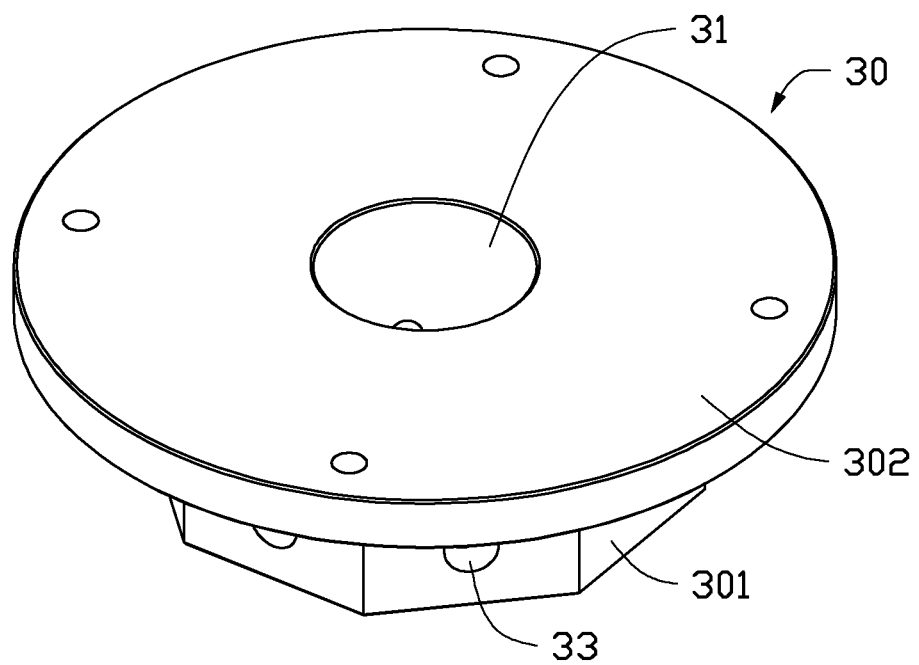
Figure 4:
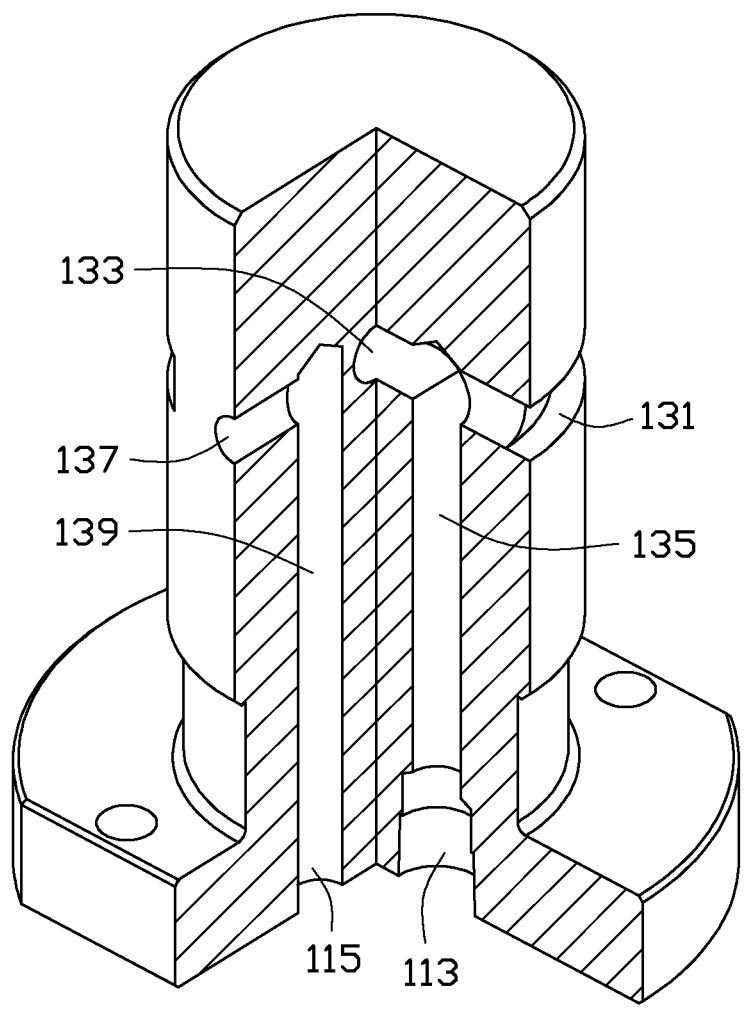
FIG. 4 is a cut-away view of the base of the rotation joint of FIG. 1.

Referring to FIGS. 2 to 4, the base 10 includes a seat 11 and a shaft portion 13 protruding substantially perpendicularly from the seat 11. The seat 11 defines two first air guiding holes 113 and a first air outlet 115. The first air guiding holes 113 are defined in a surface of the seat 11 away from the shaft portion 13 and are spaced along a lengthwise direction of the seat 11. The first air outlet 115 is defined adjacent to the first air guiding holes 113. The shaft portion 13 is substantially cylindrical and defines an air guiding groove 131 along a partial circumference of an outer sidewall of the shaft portion 13. A second air guiding hole 133 is defined along a radial direction of the shaft portion 13 and communicates with the air guiding groove 131. The second air guiding hole 133 communicates with the air guiding groove 131. The outer sidewall of the shaft portion 13 further defines a second air outlet 137 along a radial direction of the shaft portion 13, and the second air outlet 137 communicates with the first air outlet 115. The second air outlet 137 is defined between two ends of the air guiding groove 131 and does not communicate with the air guiding groove 131. In the illustrated embodiment, the second air outlet 137 is defined at a same height relative to the seat 11 as the second air guiding hole 133.

The first air guiding holes 113 of the seat 11 extend towards the second air guiding hole 133 along a lengthwise direction of the shaft portion 13 and communicate with the second air guiding hole 133, so that an air guiding channel 135 is defined in the shaft portion 13. The air guiding channel 135 communicates with the second air guiding hole 133 and the corresponding air guiding hole 113. The first air outlet 115 extends along a lengthwise direction of the shaft portion 13 towards the second air outlet 137, so that an air output channel 139 communicating with the second air outlet 137 is defined.

The rotation member 30 is rotatably sleeved on the shaft portion 13. The rotation member 30 includes a top portion 301 and a bottom portion 302 connecting the top portion 301. In one embodiment, the top portion 301 is an octagonal prism, and the bottom portion 302 is disk-shaped. A sleeve hole 31 is defined along an axis of the rotation member 30. The sleeve hole 31 is a through hole. The shaft portion 13 is received in the sleeve hole 31. Each sidewall of the top portion 301 of the rotation member 30 defines a connecting hole 33. Each connecting hole 33 extends along a radial direction of the rotation member 30 and communicates with the sleeve hole 31. In use, seven connecting holes 33 of the eight connecting holes 33 communicate with the air guiding groove 131, while the eighth connecting hole 33 communicates with the second air outlet 137.

FIG. 5 shows that a multiple air channel workstation 200 includes a rotation platform 201, a compressed air source 202, the rotation joint 100, eight gas-employed devices 2031-2038 mounted on the rotation platform 201, a vacuum generator 205, and a controller 207. The rotation platform 201 is sleeved on the top portion 301 of the rotation member 30, and is supported by the bottom portion 302. The eight gas-employed devices 2031-2038 each include a suction nozzle 2030. The eight gas-employed devices 2031-2038 are located adjacent to and correspond to the eight connecting holes 33, respectively. An opening of a suction nozzle 2030 of one of the devices 2031-2038 communicates with the second air outlet 137, while the openings of the suction nozzles of the other seven gas-employed devices communicate with the air guiding groove 131. In the illustrated embodiment, the openings of the suction nozzles 2030 are connected to the connecting holes 33 via tubes 204, respectively. The first air guiding holes 113 of the rotation joint 100 are connected to the vacuum generator 205. The compressed air source 202 is connected by a tube to the vacuum generator 205 to allow air to flow from the compressed air source 202 to the vacuum generator 205. The controller 207 is electrically connected to the vacuum generator 205 to control the vacuum generator 205, such that air can be extracted from or introduced into the first air guiding holes 113. The multiple air channel workstation 200 further includes other elements, such as a pneumatic balancer (not shown) and a gas-pressure meter (not shown). For the sake of simplifying the specification, the other elements are not introduced in detail.

In use, in the illustrated embodiment, the multiple air channel workstation 200 is configured to automatically assemble rubber plugs (not shown) to workpieces (not shown). In an original state, the seven devices 2031-2037 communicate with the air guiding groove 131, while the gas-employed device 2038 communicates with the second air outlet 137. The position of the gas-employed device 2038 in the original state is for unloading rubber plugs. The controller 207 controls the vacuum generator 205 to extract air from the first air guiding holes 113 to reduce an air pressure of the suction nozzles 2030 of the seven gas-employed devices 2031-2037 below an air pressure of the ambient air. Consequently, the seven gas-employed devices 2031-2037 suck the seven rubber plugs, respectively. The workpiece is positioned below the gas-employed device 2038. The rotation platform 201 rotates counterclockwise so that the gas-employed device 2031 can communicate with the second air outlet 137, and the gas-employed device 2038 communicates with the air guiding groove 131. Because the second air outlet 137 communicates with the ambient space, the rubber plug sucked by the gas-employed device 2031 drops from the gas-employed device 2031 and assembles to the workpiece. The next gas-employed device 2038 then sucks a rubber plug, and the rotation platform 201 continues to rotate to drop and assemble rubber plugs to the workpieces.

In alternative embodiments, the number of the connecting holes 33 can be different, and the number of the first air guiding holes 113 can be one.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A rotation joint, comprising a base and a rotation member rotatably sleeved on the base, wherein the base has an end and an outer sidewall; the base defines at least one first air guiding hole and at least one first air outlet arranged apart; the outer sidewall of the base defines an air guiding groove along a partial periphery thereof, and at least one second air guiding hole is defined along a radial direction of the base and communicates with the air guiding groove; the at least one first air guiding hole communicates with the at least one second air guiding hole, thereby defining an air guiding channel in the base; the outer sidewall of the base further defines at least one second air outlet communicating with the at least one first air outlet, thereby defining an air output channel in the base; the rotation member has a sidewall defining a plurality of connecting holes arranged apart; at least one connecting hole of the plurality of connecting holes communicates with the at least one second air outlet, and the other connecting holes of the plurality of connecting holes communicates with the air guiding groove.

2. The rotation joint of claim 1, wherein the base comprises a seat and a shaft portion substantially perpendicularly protruding from the seat, the at least one first air guiding hole and the at least one first air outlet are defined at an end of the seat away from the shaft portion, the air guiding groove, the at least one second air guiding hole, and the at least one second outlet are defined at an outer sidewall of the shaft portion, and the rotation portion is sleeved on the shaft portion.

3. The rotation joint of claim 2, wherein the at least one first air outlet extends along a lengthwise direction of the shaft portion towards the at least one second air outlet, and communicates with the at least one second air outlet.

4. The rotation joint of claim 2, wherein the at least one first air guiding hole extends along a lengthwise direction of the shaft portion towards the at least one second air guiding hole, and communicates with the at least one second air guiding hole.

5. The rotation joint of claim 1, wherein the at least one second air outlet is defined at substantially a same height as the at least one second air guiding hole relative to the seat.

6. A multiple air channel workstation, comprising:
a rotation platform;
a plurality of air-employed devices mounted on the rotation platform; and
a rotation joint comprising a base and a rotation member rotatably sleeved on the base,
wherein the base has an end and an outer sidewall; the base defines at least one first air guiding hole and at least one first air outlet arranged apart; the outer sidewall of the base defines an air guiding groove along a partial periphery thereof, and at least one second air guiding hole is defined along a radial direction of the base and communicates with the air guiding groove, the at least one first air guiding hole communicates with the at least one second air guiding hole, thereby defining an air guiding channel in the base, the outer sidewall of the base further defines at least one second air outlet communicating with the at least one first air outlet, thereby defining an air output channel in the base;
the rotation member has a sidewall defining a plurality of connecting holes arranged apart; at least one connecting hole of the plurality of connecting holes communicates with the at least one second air outlet and at least one of the plurality of air-employed devices, and the other connecting holes of the plurality of connecting holes communicates with the air guiding groove and the other air-employed devices of the plurality of air-employed devices, respectively;
the plurality of air-employed devices is rotated following a rotation of the rotation platform, so that the plurality of air-employed devices respectively communicate with the at least one second air outlet in order.

7. The multiple air channel workstation of claim 6, further comprising a vacuum generator and a controller, wherein the vacuum generator communicates with the at least one first air guiding hole, and the controller is electrically connected to the vacuum generator, and controls the vacuum generator.

8. The multiple air channel workstation of claim 6, wherein the base comprises a seat and a shaft portion substantially perpendicularly protruding from the seat, the at least one first air guiding hole and the at least one first air outlet are defined at an end of the seat away from the shaft portion, the air guiding groove, the at least one second air guiding hole, and the at least one second outlet are defined at an outer sidewall of the shaft portion, and the rotation portion is sleeved on the shaft portion.

9. The multiple air channel workstation of claim 8, wherein the at least one first air outlet extends along a lengthwise direction of the shaft portion towards the at least one second air outlet, and communicates with the at least one second air outlet.

10. The multiple air channel workstation of claim 8, wherein the at least one first air guiding hole extends along a lengthwise direction of the shaft portion towards the at least one second air guiding hole, and communicates with the at least one second air guiding hole.

11. A multiple air channel workstation, comprising:
a rotation platform;
a plurality of air-employed devices mounted on the rotation platform; and
a rotation joint comprising a base and a rotation member rotatably sleeved on the base,
wherein the base has an end and an outer sidewall; the base defines a first air guiding hole and a first air outlet arranged apart; the outer sidewall of the base defines an air guiding groove along a partial periphery thereof, and a second air guiding hole is defined along a radial direction of the base and communicates with the air guiding groove, the first air guiding hole communicates with the second air guiding hole, the outer sidewall of the base further defining a second air outlet communicating with the first air outlet;
the rotation member has a sidewall defining a plurality of connecting holes arranged apart; at least one connecting hole of the plurality of connecting holes communicates with the second air outlet and at least one air-employed device of the plurality of air-employed devices, and the other connecting holes of the plurality of connecting holes communicates with the air guiding groove and the other air-employed devices of the plurality of air-employed devices, respectively;

the plurality of air-employed devices rotates following a rotation of the rotation platform, so that the plurality of air-employed devices respectively communicate with the second air outlet in turns.

12. The multiple air channel workstation of claim 11, further comprising a vacuum generator and a controller, wherein the vacuum generator communicates with the at least one first air guiding hole, and the controller is electrically connected to the vacuum generator, and controls the vacuum generator.

13. The multiple air channel workstation of claim 12, further comprising an air source, wherein air source communicates with the vacuum generator.

14. The multiple air channel workstation of claim 11, wherein each of the plurality of air-employed device defines a suction nozzle communicating with the corresponding one of the plurality of connecting holes.

15. The multiple air channel workstation of claim 11, wherein the base comprises a seat and a shaft portion substantially perpendicularly protruding from the seat, the first air guiding hole and the first air outlet are defined at an end of the seat away from the shaft portion, the air guiding groove, the second air guiding hole, and the second outlet are defined at an outer sidewall of the shaft portion, and the rotation portion is sleeved on the shaft portion.

16. The multiple air channel workstation of claim 15, wherein the first air outlet extends along a lengthwise direction of the shaft portion towards the second air outlet, and communicates with the second air outlet.

17. The multiple air channel workstation of claim 15, wherein the first air guiding hole extends along a lengthwise direction of the shaft portion towards the second air guiding hole, and communicates with the second air guiding hole.

* * * * *